(12) United States Patent
Deng et al.

(10) Patent No.: US 10,642,438 B1
(45) Date of Patent: May 5, 2020

(54) METAL MESH TOUCHING SENSING ELECTRODE ASSEMBLY

(71) Applicant: WUHAN CHINA STAR OPTOELECTRONICS SEMICONDUCTOR DISPLAY TECHNOLOGY CO., LTD., Wuhan, Hubei (CN)

(72) Inventors: Yichao Deng, Hubei (CN); Qibing Dai, Hubei (CN); Yalong Ma, Hubei (CN)

(73) Assignee: WUHAN CHINA STAR OPTOELECTRONICS SEMICONDUCTOR DISPLAY TECHNOLOGY CO., LTD., Wuhan, Hubei (CN)

( * ) Notice: Subject to any disclaimer, the term of this patent is extended or adjusted under 35 U.S.C. 154(b) by 0 days.

(21) Appl. No.: 16/326,214

(22) PCT Filed: Jan. 7, 2019

(86) PCT No.: PCT/CN2019/070591
§ 371 (c)(1),
(2) Date: Feb. 17, 2019

(30) Foreign Application Priority Data

Nov. 28, 2018 (CN) .......................... 2018 1 1430476

(51) Int. Cl.
*G06F 3/044* (2006.01)

(52) U.S. Cl.
CPC .. *G06F 3/0446* (2019.05); *G06F 2203/04111* (2013.01); *G06F 2203/04112* (2013.01)

(58) Field of Classification Search
CPC ......... G06F 3/0446; G06F 2203/04111; G06F 2203/04112
See application file for complete search history.

(56) References Cited

U.S. PATENT DOCUMENTS

| | | | | |
|---|---|---|---|---|
| 2010/0295819 A1* | 11/2010 | Ozeki | ..................... | G06F 3/044 345/174 |
| 2010/0302201 A1* | 12/2010 | Ritter | ..................... | G06F 3/044 345/174 |
| 2013/0313098 A1* | 11/2013 | Chang | ..................... | G06F 3/044 200/600 |
| 2019/0163301 A1* | 5/2019 | Tai | ........................ | G06F 3/0412 |
| 2019/0265820 A1* | 8/2019 | Li | .......................... | G06F 3/0443 |

* cited by examiner

*Primary Examiner* — Abhishek Sarma
(74) *Attorney, Agent, or Firm* — Mark M. Friedman (57) ABSTRACT

A metal mesh touching sensing electrode assembly includes a metal mesh, first electrode columns, and second electrode rows. The first electrode columns are disposed on the metal mesh. Each first electrode column includes first electrode units which are mutually connected. Each of the first electrode units includes a first outer frame, first connection patterns, and first boundary patterns. The first connection patterns include a first T-shaped portion and a first linear portion. Each second electrode row includes second electrode units which are mutually connected with each other. Each second electrode unit includes a second outer frame, second connection patterns, and second boundary patterns. Each second connection pattern includes a second T-shaped portion and a second linear portion. The first electrode units and second electrode units of the metal mesh touching sensing electrode assembly have complicated patterns to prevent a visibility issue of an unexpected visual strip effect.

17 Claims, 5 Drawing Sheets

METAL MESH TOUCHING SENSING ELECTRODE ASSEMBLY

FIELD OF INVENTION

The present invention relates to a touching sensing electrode assembly, especially to a metal mesh touching sensing electrode assembly that has a first electrode and a second electrode including various complicated geometric patterns to effectively prevent visibility issues of an unexpected visual strip effect.

BACKGROUND OF INVENTION

With the development of display technologies, touch panels are more and more common for electronic devices, such as tablets and smart phones. In prior art, capacitive touch panels are extensively applied to smart phones and tablets. A conventional capacitive touch panel employs a conductive film of indium tin oxide (ITO) as material of touching sensing electrodes. Such capacitive touch panels have disadvantages of high prices, large resistance, and poor flexibilities. A metal mesh technology compensates the above disadvantages of the ITO touching sensing electrodes.

However, touch display panel patterns on a conventional metal mesh are overly simple and regular and therefore fail to prevent a visibility issue of an unexpected visual strip effect.

Therefore, it is necessary to provide a metal mesh touching sensing electrode assembly to solve the issue of the prior art.

SUMMARY OF INVENTION

Technical Issue

According to the technical issue that touch display panel patterns on a conventional metal mesh are overly simple and regular to easily cause unexpected visual strip effect, the present invention provides a metal mesh touching sensing electrode assembly to solve the above technical issue.

Technical Solution

A main objective of the present invention is to provide a metal mesh touching sensing electrode assembly, comprising:

a metal mesh comprising a plurality of first metal wires and a plurality of second metal wires, the first metal wires intersecting the second metal wires perpendicularly and forming therewith a plurality of rhombus-shaped mesh eyes;

a plurality of first electrode columns disposed on the metal mesh, and each of the first electrode columns comprising a plurality of first electrode units connecting with each other, wherein each of the first electrode units is rhombus-shaped and comprises:

a first outer frame being rhombus-shaped;

a plurality of first connection patterns disposed within the first outer frame, connected to the first outer frame, and each of the first connection patterns comprising a first T-shaped portion and a first linear portion, the first T-shaped portion comprising a transverse line portion and a longitudinal line portion extending perpendicular from a center of the transverse line portion, and the first linear portion extending perpendicularly from an end of the transverse line portion of the first T-shaped portion; and a plurality of first boundary patterns extending outwardly from the first outer frame; and a plurality of second electrode rows disposed on the metal mesh and intersecting the first electrode columns perpendicularly, and each of the second electrode rows comprising a plurality of second electrode units connecting with each other, wherein each of the second electrode units is rhombus-shaped.

In an embodiment of the present invention, each of the first boundary patterns is cross-shaped.

In an embodiment of the present invention, a plurality of dummy electrode patterns are formed within each of the first electrode units, the dummy electrode patterns are disposed within the first outer frame and are staggered with the first connection patterns, and each of the dummy electrode patterns comprises a T-shaped section and a perpendicular section, and wherein the T-shaped section comprises a transverse line section and a longitudinal line section extending perpendicularly from a center of the transverse line section, and the perpendicular section extends perpendicularly from a distal end of the longitudinal line section.

In an embodiment of the present invention, each of the second electrode units comprises:

a second outer frame being rhombus-shaped;

a plurality of second connection patterns disposed in the second outer frame and connected to the second outer frame, each of the second connection patterns comprising a second T-shaped portion and a second linear portion, the second T-shaped portion comprising a transverse line block and a longitudinal line block extending perpendicularly from a center of the transverse line block, and the second linear portion extending perpendicularly from an end of the transverse line block of the second T-shaped portion; and a plurality of second boundary patterns extending outwardly from the second outer frame.

In an embodiment of the present invention, each of the second boundary patterns is cross-shaped.

In an embodiment of the present invention, and each of the first boundary patterns and an adjacent one of the second boundary patterns engage with each other.

In an embodiment of the present invention, each of the first boundary patterns is cross-shaped; each of the second boundary patterns is cross-shaped; and each of the first boundary patterns and an adjacent one of the second boundary patterns engage with each other.

In an embodiment of the present invention, a plurality of dummy electrode patterns are formed within each of the second electrode units, the dummy electrode patterns are disposed in the second outer frame and are staggered with the second connection patterns, and each of the dummy electrode patterns comprises a T-shaped section and a perpendicular section, and wherein the T-shaped section comprises a transverse line section and a longitudinal line section extending perpendicularly from a center of the transverse line section, and the perpendicular section extends perpendicularly from a distal end of the longitudinal line section.

In an embodiment of the present invention, the first electrode units are made of some of the rhombus-shaped mesh eyes, and the second electrode units are made of the others of the rhombus-shaped mesh eyes.

In an embodiment of the present invention, two adjacent of the first electrode units of each of the first electrode columns are connected to each other through a first bridging unit; two adjacent of the first electrode units respectively of two adjacent of the first electrode columns are connected to each other through a second bridging unit; two adjacent of the second electrode units of each of the second electrode rows are connected to each other directly; and two adjacent of the second electrode units respectively of two adjacent of the second electrode rows are connected to each other directly.

Another objective of the present invention is to provide a metal mesh touching sensing electrode assembly, comprising:
- a metal mesh comprising a plurality of first metal wires and a plurality of second metal wires, the first metal wires intersecting the second metal wires perpendicularly and forming therewith a plurality of rhombus-shaped mesh eyes;
- a plurality of first electrode columns disposed on the metal mesh, and each of the first electrode columns comprising a plurality of first electrode units connecting with each other, wherein each of the first electrode units is rhombus-shaped and comprises:
  - a first outer frame being rhombus-shaped;
  - a plurality of first connection patterns disposed within the first outer frame, connected to the first outer frame, and each of the first connection patterns comprising a first T-shaped portion and a first linear portion, the first T-shaped portion comprising a transverse line portion and a longitudinal line portion extending perpendicular from a center of the transverse line portion, and the first linear portion extending perpendicularly from an end of the transverse line portion of the first T-shaped portion; and
  - a plurality of first boundary patterns extending outwardly from the first outer frame; and
- a plurality of second electrode rows disposed on the metal mesh and intersecting the first electrode columns perpendicularly, and each of the second electrode rows comprising a plurality of second electrode units connecting with each other, wherein each of the second electrode units is rhombus-shaped;
  - wherein each of the first boundary patterns is cross-shaped;
  - wherein a plurality of dummy electrode patterns are formed within each of the first electrode units, the dummy electrode patterns are disposed within the first outer frame and are staggered with the first connection patterns, and each of the dummy electrode patterns comprises a T-shaped section and a perpendicular section, the T-shaped section comprises a transverse line section and a longitudinal line section extending perpendicularly from a center of the transverse line section, and the perpendicular section extends perpendicularly from a distal end of the longitudinal line section;
  - wherein each of the second electrode units comprises:
    - a second outer frame being rhombus-shaped;
    - a plurality of second connection patterns disposed in the second outer frame and connected to the second outer frame, each of the second connection patterns comprising a second T-shaped portion and a second linear portion, the second T-shaped portion comprising a transverse line block and a longitudinal line block extending perpendicularly from a center of the transverse line block, and the second linear portion extending perpendicularly from an end of the transverse line block of the second T-shaped portion; and
    - a plurality of second boundary patterns extending outwardly from the second outer frame.

In an embodiment of the present invention, each of the second boundary patterns is cross-shaped.

In an embodiment of the present invention, each of the first boundary patterns and an adjacent one of the second boundary patterns engage with each other.

In an embodiment of the present invention, each of the first boundary patterns is cross-shaped; each of the second boundary patterns is cross-shaped; and each of the first boundary patterns and an adjacent one of the second boundary patterns engage with each other.

In an embodiment of the present invention, a plurality of dummy electrode patterns are formed within each of the second electrode units, the dummy electrode patterns are disposed in the second outer frame and are staggered with the second connection patterns, and each of the dummy electrode patterns comprises a T-shaped section and a perpendicular section, the T-shaped section comprises a transverse line section and a longitudinal line section extending perpendicularly from a center of the transverse line section, and the perpendicular section extends perpendicularly from a distal end of the longitudinal line section.

In an embodiment of the present invention, the first electrode units are made of some of the rhombus-shaped mesh eyes, and the second electrode units is made of the others of the rhombus-shaped mesh eyes.

In an embodiment of the present invention, two adjacent of the first electrode units of each of the first electrode columns are connected to each other through a first bridging unit; two adjacent of the first electrode units respectively of two adjacent of the first electrode columns are connected to each other through a second bridging unit; two adjacent of the second electrode units of each of the second electrode rows are connected to each other directly; and two adjacent of the second electrode units respectively of two adjacent of the second electrode rows are connected to each other directly.

Advantages

Compared to the prior art, the first connection patterns, the first boundary patterns, the second connection patterns, the second boundary patterns, and the dummy electrode patterns of the first electrode units and the second electrode units of the metal mesh touching sensing electrode assembly of the present invention are all complicated geometric patterns and therefore prevent the visibility issue of unexpected visual strip effect.

In order to make the above contents of the present invention more obvious and understandable, preferred embodiments are described in detail with reference to the drawings as follows.

DETAILED DESCRIPTION OF PREFERRED EMBODIMENTS

Figure 1:
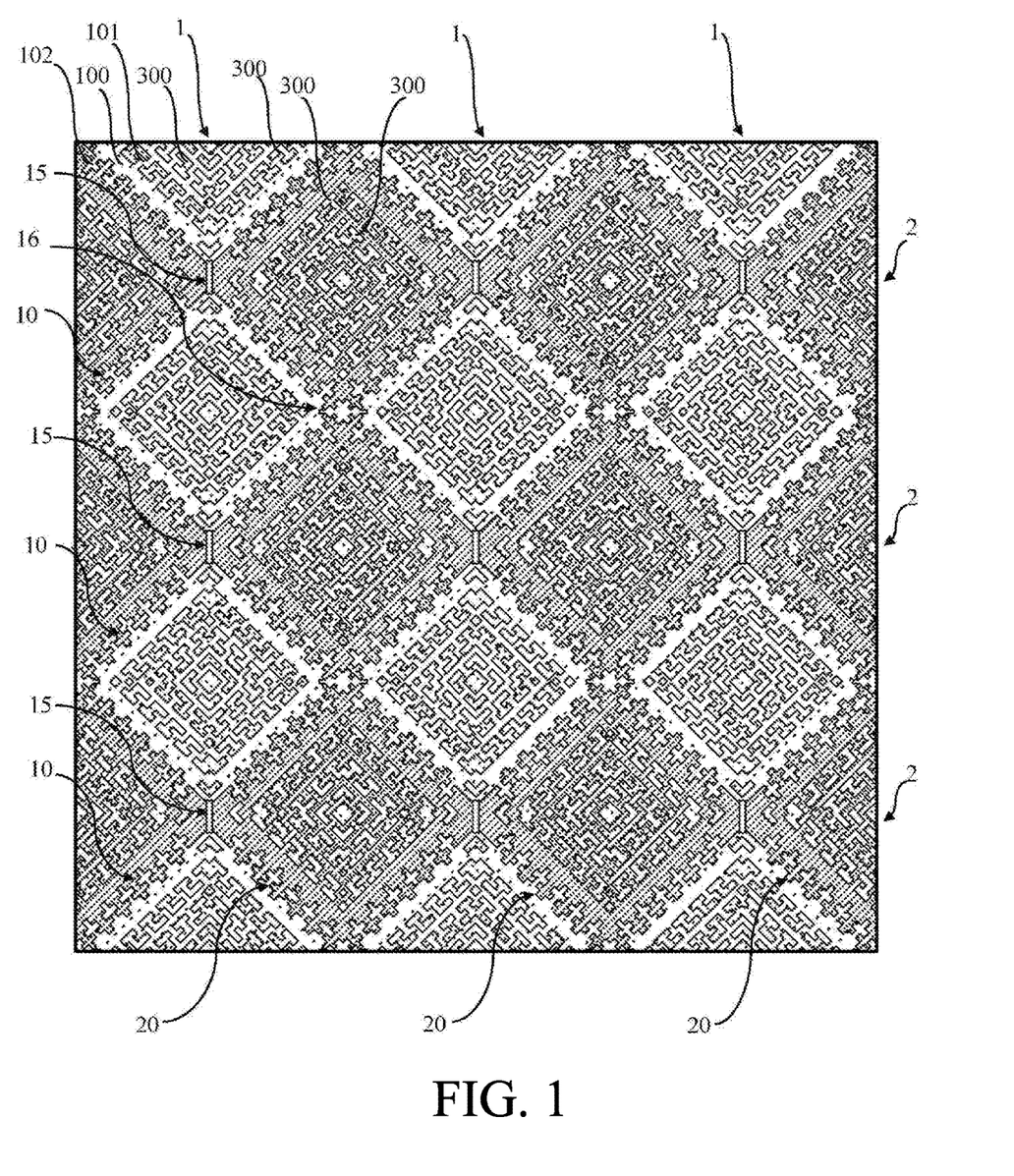
FIG. 1 is a partial top view of a metal mesh touching sensing electrode assembly of the present invention.
Figure 2:
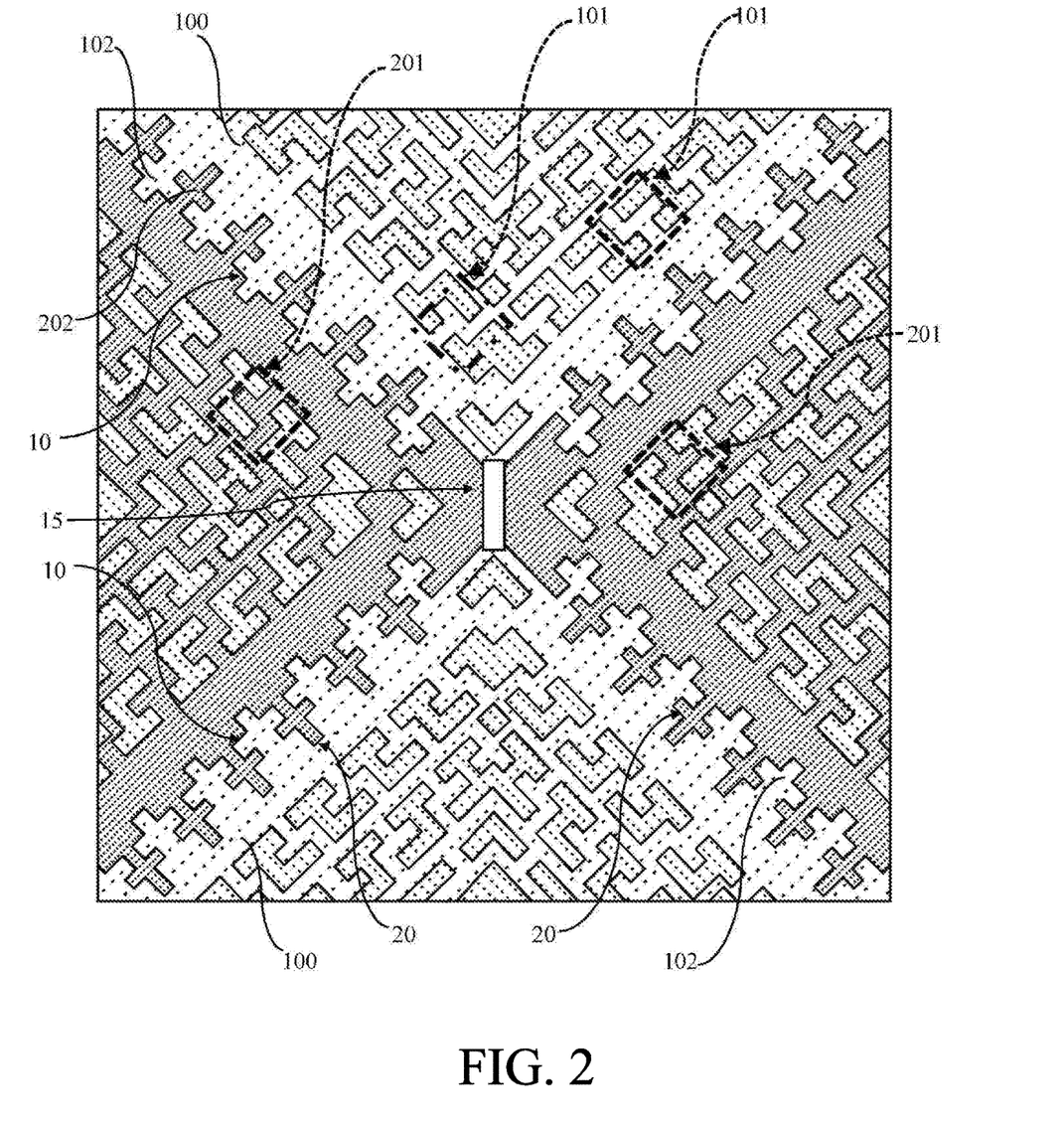
FIG. 2 is a partially enlarged top view of the metal mesh touching sensing electrode assembly of the present invention in FIG. 1, wherein a pattern shown is a unit pattern.
Figure 5:
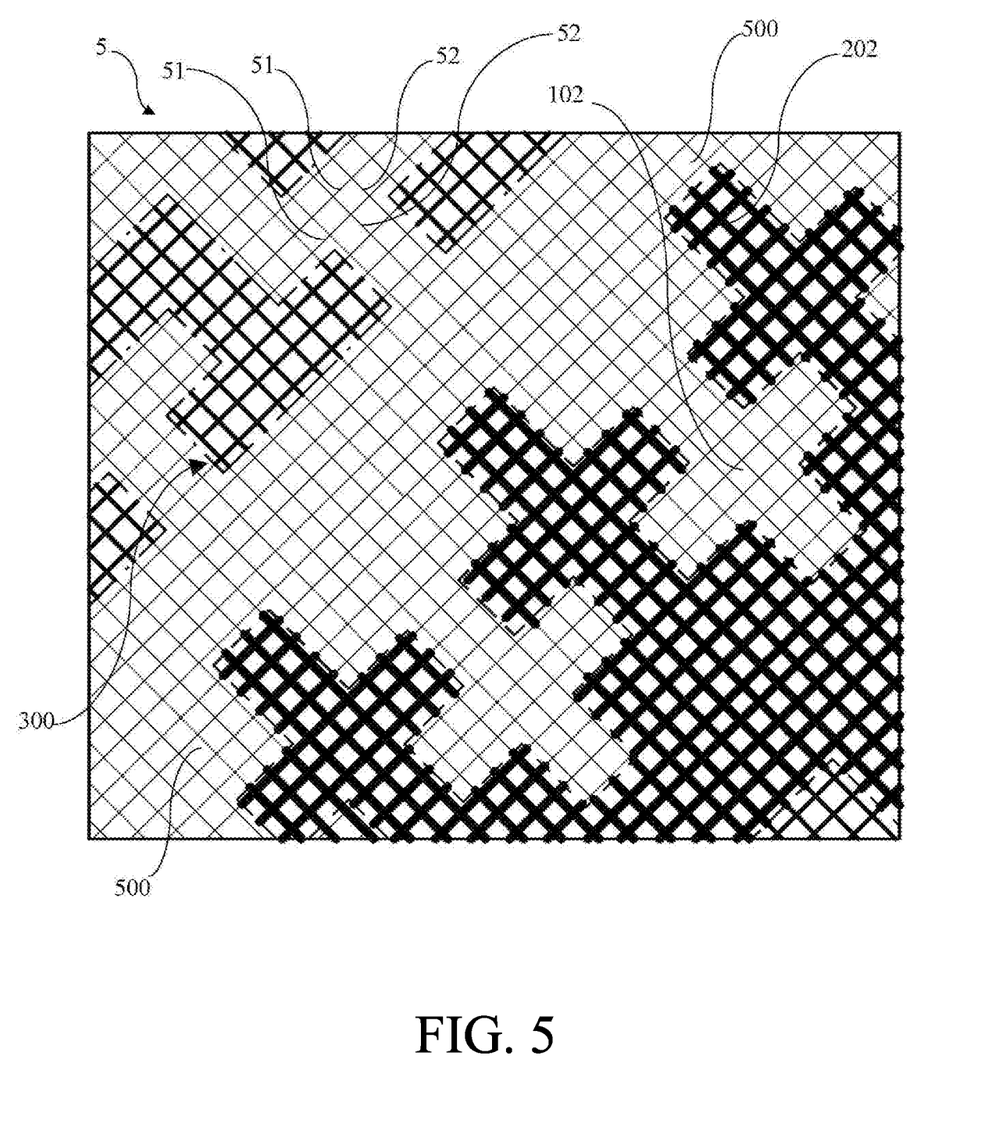
FIG. 5 is still another further partially enlarged top view of the metal mesh touching sensing electrode assembly of the present invention in FIG. 2, wherein a plurality of first metal wires intersect a plurality of second metal wires perpendicularly to form a plurality of rhombus-shaped mesh eyes.

With reference to FIGS. 1, 2, and 5, the present invention metal mesh touching sensing electrode assembly comprises a metal mesh 5, a plurality of first electrode columns 1, and a plurality of second electrode rows 2.

The metal mesh 5 comprises a plurality of first metal wires 51 and a plurality of second metal wires 52, as shown in FIG. 5. The first metal wires 51 intersect the second metal wires 52 perpendicularly to form a plurality of rhombus-shaped mesh eyes 500.

The first electrode columns 1 are disposed on the metal mesh 5, and each of the first electrode columns 1 comprises a plurality of first electrode units 10 connecting with each other. In an embodiment of the present invention, upper and lower two adjacent of the first electrode units 10 in each of the first electrode columns 1 are connected to each other through a first bridging unit 15. The two adjacent left and right of the first electrode units 10 of the two adjacent of the first electrode columns 1 are connected to each other through a second bridging unit 16.

The first electrode units 10 are made of some of the rhombus-shaped mesh eyes 500. Each of the first electrode units 10 is rhombus-shaped and comprises a first outer frame 100, a plurality of first connection patterns 101, and a plurality of first boundary patterns 102.

Figure 3:
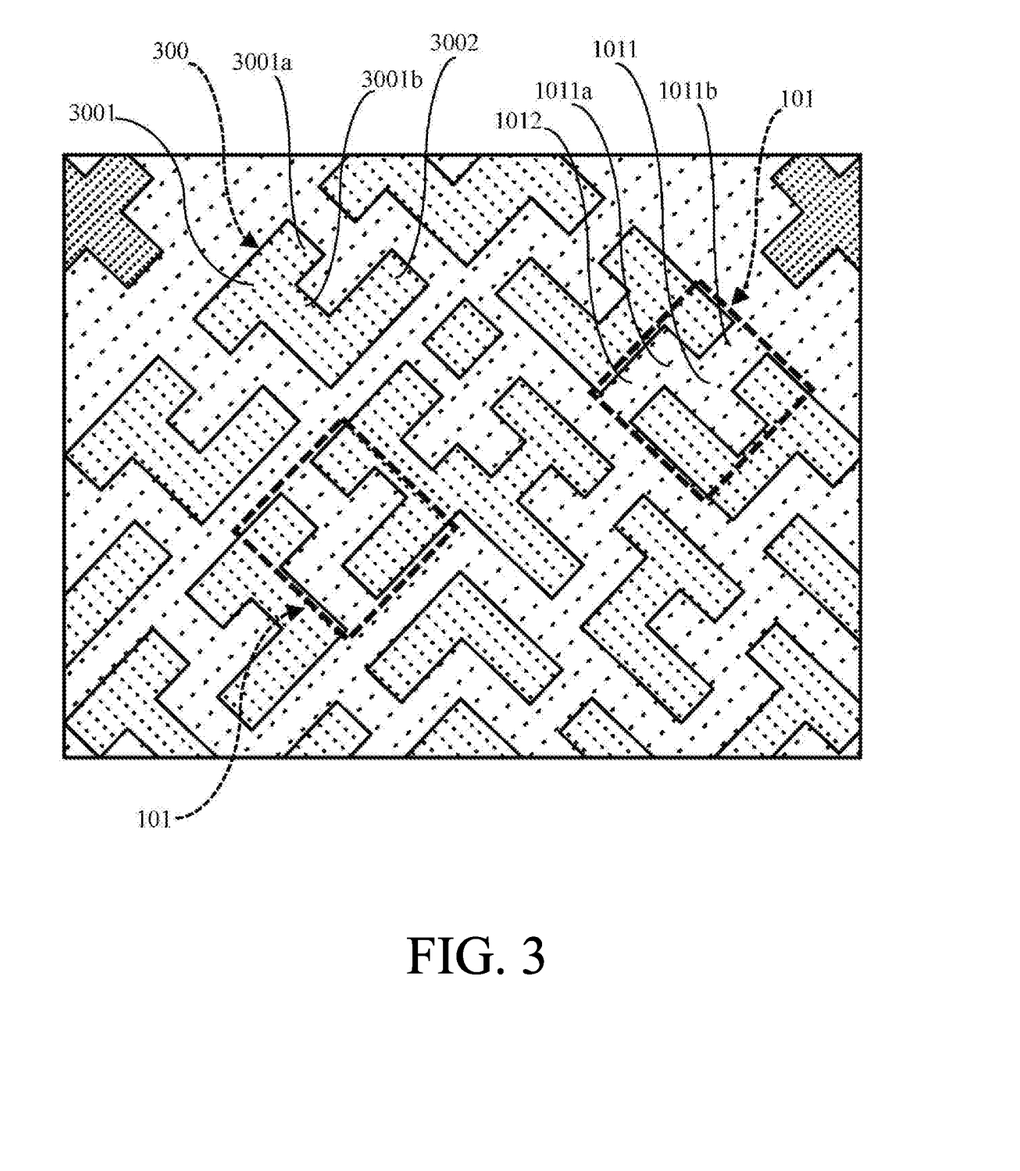
FIG. 3 is a further partially enlarged top view of the metal mesh touching sensing electrode assembly of the present invention in FIG. 2.

With reference to FIG. 3, the first outer frame 100 is rhombus-shaped. The first connection patterns 101 are disposed within the first outer frame 100, and are connected to the first outer frame 100. Each of the first connection patterns 101 comprises a first T-shaped portion 1011 and a first linear portion 1012. The first T-shaped portion 1011 comprises a transverse line portion 1011a and a longitudinal line portion 1011b extending perpendicular from a center of the transverse line portion 1011a. The first linear portion 1012 extends perpendicularly from an end of the transverse line portion 1011a of the first T-shaped portion 1011. The first boundary patterns 102 extend outwardly from the first outer frame 100. Each of the first boundary patterns 102 is cross-shaped.

In an embodiment of the present invention, a plurality of dummy electrode patterns 300 are formed within each of the first electrode units 10. The dummy electrode patterns 300 are disposed within the first outer frame 100 and are staggered with the first connection patterns 101. Each of the dummy electrode patterns 300 comprises a T-shaped section 3001 and a perpendicular section 3002. The T-shaped section 3001 comprises a transverse line section 3001a and a longitudinal line section 3001b extending perpendicularly from a center of the transverse line section 3001a. The perpendicular section 3002 extends perpendicularly from a distal end of the longitudinal line section 3001b.

The second electrode rows 2 are disposed on the metal mesh 5 and intersect the first electrode columns 1 perpendicularly. Each of the second electrode rows 2 comprises a plurality of second electrode units 20 connecting with each other. The second electrode units 20 are made of the others of the rhombus-shaped mesh eyes 500. In an embodiment of the present invention, the two adjacent upper and lower of the second electrode units 20 of each of the second electrode rows 2 are connected to each other directly. Left and right two adjacent of the second electrode units 20 of two adjacent of second electrode rows 2 are connected to each other directly.

Each of the second electrode units 20 is rhombus-shaped and comprises: a second outer frame 200, a plurality of second connection patterns 201, and a plurality of second boundary patterns 202.

Figure 4:
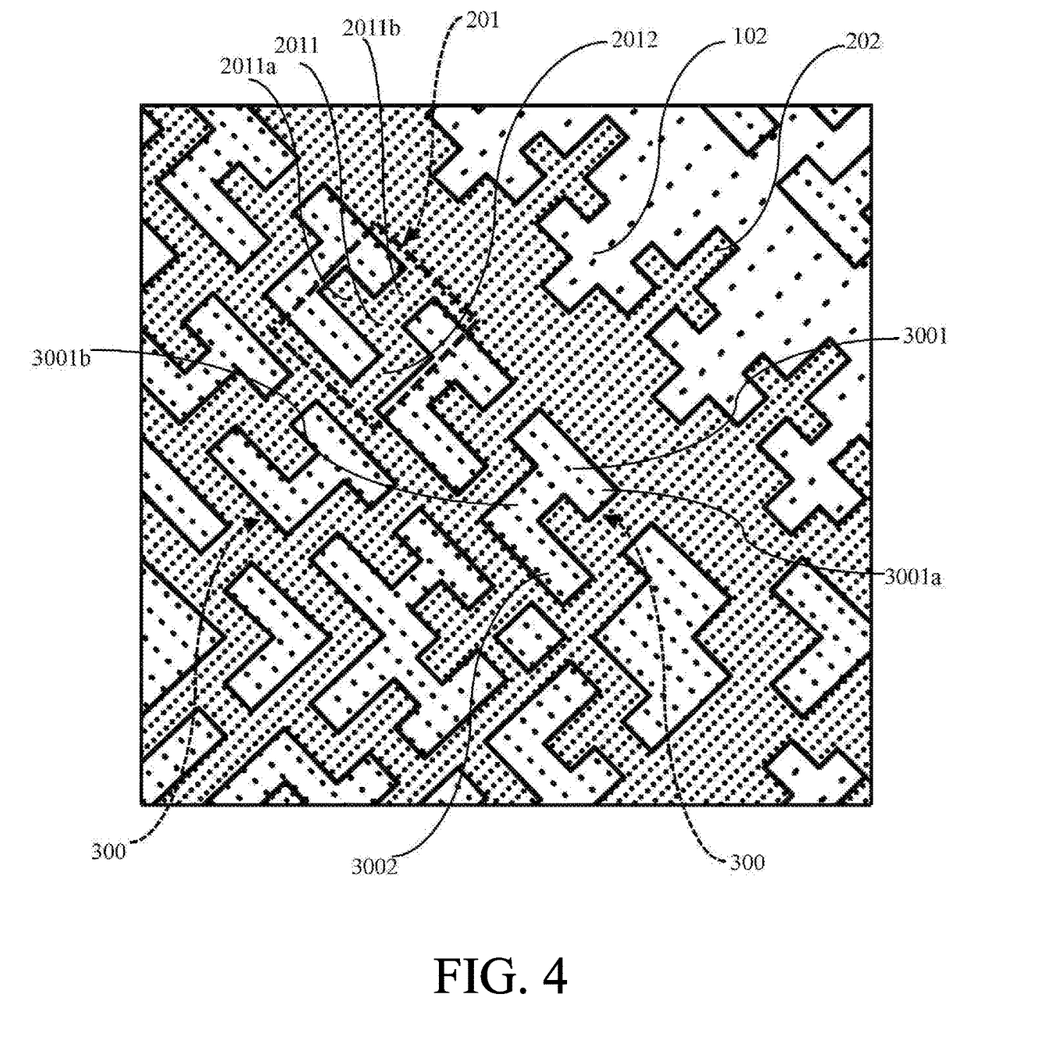
FIG. 4 is another further partially enlarged top view of the metal mesh touching sensing electrode assembly of the present invention in FIG. 2.

With reference to FIG. 4, the second outer frame 200 is rhombus-shaped. The second connection patterns 201 are disposed in the second outer frame 200 and are connected to the second outer frame 200. Each of the second connection patterns 201 comprises a second T-shaped portion 2011 and a second linear portion 2012. The second T-shaped portion 2011 comprises a transverse line block 2011a and a longitudinal line block 2011b extending perpendicularly from a center of the transverse line block 2011a. The second linear portion 2012 extends perpendicularly from an end of the transverse line block 2011a of the second T-shaped portion 2011.

The second boundary patterns 202 extend outwardly from the second outer frame 200. Each of the second boundary patterns 202 is cross-shaped.

In an embodiment of the present invention, the plurality of dummy electrode patterns 300 are formed within each of the second electrode units 20. The dummy electrode patterns 300 are disposed in the second outer frame 200 and are staggered with the second connection patterns 201. Each of the dummy electrode patterns 300 comprises the T-shaped section 3001 and the perpendicular section 3002. The T-shaped section 3001 comprises the transverse line section 3001a and the longitudinal line section 3001b extending perpendicularly from a center of the transverse line section 3001a. The perpendicular section 3002 extends perpendicularly from a distal end of the longitudinal line section 3001b.

In an embodiment of the present invention, each of the first boundary patterns 102 and an adjacent one of the second boundary patterns 202 engage with each other. In another embodiment of the present invention, each of the first boundary patterns 102 is cross-shaped; each of the second boundary patterns 202 is cross-shaped; each of the first boundary patterns 102 and an adjacent one of the second boundary patterns 202 engage with each other.

Compared to the prior art, the first connection patterns 101, the first boundary patterns 102, the second connection patterns 201, the second boundary patterns 202, and the dummy electrode patterns 300 of the first electrode units 10 and the second electrode units 20 of the metal mesh touching sensing electrode assembly of the present invention are all complicated geometric patterns to effectively prevent a visibility issue of unexpected visual strip effect.

Although the preferred embodiments of the present invention have been disclosed as above, the aforementioned preferred embodiments are not used to limit the present invention. The person of ordinary skill in the art may make various changes and modifications without departing from the spirit and scope of the present invention. Therefore, the scope of protection of the present invention is defined by the scope of the claims.

What is claimed is:

1. A metal mesh touching sensing electrode assembly, comprising:
    a metal mesh comprising a plurality of first metal wires and a plurality of second metal wires, the first metal wires intersecting the second metal wires perpendicularly and forming therewith a plurality of rhombus-shaped mesh eyes;

a plurality of first electrode columns disposed on the metal mesh, and each of the first electrode columns comprising a plurality of first electrode units connecting with each other, wherein each of the first electrode units is rhombus-shaped and comprises:
   a first outer frame being rhombus-shaped;
   a plurality of first connection patterns disposed within the first outer frame, connected to the first outer frame, and each of the first connection patterns comprising a first T-shaped portion and a first linear portion, the first T-shaped portion comprising a transverse line portion and a longitudinal line portion extending perpendicular from a center of the transverse line portion, and the first linear portion extending perpendicularly from an end of the transverse line portion of the first T-shaped portion; and
   a plurality of first boundary patterns extending outwardly from the first outer frame; and
a plurality of second electrode rows disposed on the metal mesh and intersecting the first electrode columns perpendicularly, and each of the second electrode rows comprising a plurality of second electrode units connecting with each other, wherein each of the second electrode units is rhombus-shaped.

2. The metal mesh touching sensing electrode assembly as claimed in claim 1, wherein each of the first boundary patterns is cross-shaped.

3. The metal mesh touching sensing electrode assembly as claimed in claim 1, wherein a plurality of dummy electrode patterns are formed within each of the first electrode units, the dummy electrode patterns are disposed within the first outer frame and are staggered with the first connection patterns, and each of the dummy electrode patterns comprises a T-shaped section and a perpendicular section, and wherein the T-shaped section comprises a transverse line section and a longitudinal line section extending perpendicularly from a center of the transverse line section, and the perpendicular section extends perpendicularly from a distal end of the longitudinal line section.

4. The metal mesh touching sensing electrode assembly as claimed in claim 1, wherein each of the second electrode units comprises:
   a second outer frame being rhombus-shaped;
   a plurality of second connection patterns disposed in the second outer frame and connected to the second outer frame, each of the second connection patterns comprising a second T-shaped portion and a second linear portion, the second T-shaped portion comprising a transverse line block and a longitudinal line block extending perpendicularly from a center of the transverse line block, and the second linear portion extending perpendicularly from an end of the transverse line block of the second T-shaped portion; and
   a plurality of second boundary patterns extending outwardly from the second outer frame.

5. The metal mesh touching sensing electrode assembly as claimed in claim 4, wherein each of the second boundary patterns is cross-shaped.

6. The metal mesh touching sensing electrode assembly as claimed in claim 1, wherein each of the first boundary patterns and an adjacent one of the second boundary patterns engage with each other.

7. The metal mesh touching sensing electrode assembly as claimed in claim 4, wherein each of the first boundary patterns is cross-shaped; each of the second boundary patterns is cross-shaped; and each of the first boundary patterns and an adjacent one of the second boundary patterns engage with each other.

8. The metal mesh touching sensing electrode assembly as claimed in claim 4, wherein the plurality of dummy electrode patterns are formed within each of the second electrode units, the dummy electrode patterns are disposed in the second outer frame and are staggered with the second connection patterns, and each of the dummy electrode patterns comprises the T-shaped section and the perpendicular section, and wherein the T-shaped section comprises the transverse line section and the longitudinal line section extending perpendicularly from a center of the transverse line section, and the perpendicular section extends perpendicularly from the distal end of the longitudinal line section.

9. The metal mesh touching sensing electrode assembly as claimed in claim 1, wherein the first electrode units are made of some of the rhombus-shaped mesh eyes, and the second electrode units are made of the others of the rhombus-shaped mesh eyes.

10. The metal mesh touching sensing electrode assembly as claimed in claim 1, wherein
   two adjacent of the first electrode units of each of the first electrode columns are connected to each other through a first bridging unit;
   two adjacent of the first electrode units of two adjacent of the first electrode columns are connected to each other through a second bridging unit;
   two adjacent of the second electrode units of each of the second electrode rows are connected to each other directly; and
   two adjacent of the second electrode units of two adjacent of the second electrode rows are connected to each other directly.

11. A metal mesh touching sensing electrode assembly, comprising:
   a metal mesh comprising a plurality of first metal wires and a plurality of second metal wires, the first metal wires intersecting the second metal wires perpendicularly and forming therewith a plurality of rhombus-shaped mesh eyes;
   a plurality of first electrode columns disposed on the metal mesh, and each of the first electrode columns comprising a plurality of first electrode units connecting with each other, wherein each of the first electrode units is rhombus-shaped and comprises:
      a first outer frame being rhombus-shaped;
      a plurality of first connection patterns disposed within the first outer frame, connected to the first outer frame, and each of the first connection patterns comprising a first T-shaped portion and a first linear portion, the first T-shaped portion comprising a transverse line portion and a longitudinal line portion extending perpendicular from a center of the transverse line portion, and the first linear portion extending perpendicularly from an end of the transverse line portion of the first T-shaped portion; and
      a plurality of first boundary patterns extending outwardly from the first outer frame; and
   a plurality of second electrode rows disposed on the metal mesh and intersecting the first electrode columns perpendicularly, and each of the second electrode rows comprising a plurality of second electrode units connecting with each other, wherein each of the second electrode units is rhombus-shaped;
   wherein each of the first boundary patterns is cross-shaped;

wherein a plurality of dummy electrode patterns are formed within each of the first electrode units, the dummy electrode patterns are disposed within the first outer frame and are staggered with the first connection patterns, and each of the dummy electrode patterns comprises a T-shaped section and a perpendicular section, and wherein the T-shaped section comprises a transverse line section and a longitudinal line section extending perpendicularly from a center of the transverse line section, and the perpendicular section extends perpendicularly from a distal end of the longitudinal line section;

wherein each of the second electrode units comprises:
  a second outer frame being rhombus-shaped;
    a plurality of second connection patterns disposed in the second outer frame and connected to the second outer frame, each of the second connection patterns comprising a second T-shaped portion and a second linear portion, the second T-shaped portion comprising a transverse line block and a longitudinal line block extending perpendicularly from a center of the transverse line block, and the second linear portion extending perpendicularly from an end of the transverse line block of the second T-shaped portion; and
    a plurality of second boundary patterns extending outwardly from the second outer frame.

12. The metal mesh touching sensing electrode assembly as claimed in claim 11, wherein each of the second boundary patterns is cross-shaped.

13. The metal mesh touching sensing electrode assembly as claimed in claim 11, wherein each of the first boundary patterns and an adjacent one of the second boundary patterns engage with each other.

14. The metal mesh touching sensing electrode assembly as claimed in claim 11, wherein each of the first boundary patterns is cross-shaped; each of the second boundary patterns is cross-shaped; and each of the first boundary patterns and an adjacent one of the second boundary patterns engage with each other.

15. The metal mesh touching sensing electrode assembly as claimed in claim 11, wherein a plurality of dummy electrode patterns are formed within each of the second electrode units, the dummy electrode patterns are disposed in the second outer frame and are staggered with the second connection patterns, and each of the dummy electrode patterns comprises a T-shaped section and a perpendicular section, and wherein the T-shaped section comprises a transverse line section and a longitudinal line section extending perpendicularly from a center of the transverse line section, and the perpendicular section extends perpendicularly from a distal end of the longitudinal line section.

16. The metal mesh touching sensing electrode assembly as claimed in claim 11, wherein the first electrode units are made of some of the rhombus-shaped mesh eyes, and the second electrode units are made of the others of the rhombus-shaped mesh eyes.

17. The metal mesh touching sensing electrode assembly as claimed in claim 11, wherein
  two adjacent of the first electrode units of each of the first electrode columns are connected to each other through a first bridging unit;
  two adjacent of the first electrode units respectively of two adjacent of the first electrode columns are connected to each other through a second bridging unit;
  two adjacent of the second electrode units of each of the second electrode rows are connected to each other directly; and
  two adjacent of the second electrode units respectively of two adjacent of the second electrode rows are connected to each other directly.

\* \* \* \* \*